*(12)* United States Patent
Patel et al.

(10) Patent No.: US 12,373,981 B2
(45) Date of Patent: Jul. 29, 2025

(54) SYSTEM AND METHODS FOR AUTOMATICALLY REGISTERING AND DISTRIBUTING MODULAR COMPUTER COMPONENT INFORMATION AND SERVICES THROUGH A NETWORK

(71) Applicant: Framework Computer LLC, Burlingame, CA (US)

(72) Inventors: Nirav Patel, Burlingame, CA (US); Kieran Levin, Burlingame, CA (US); Poyu Chen, Burlingame, CA (US); Chris Lombardozzi, Burlingame, CA (US)

(73) Assignee: Framework Computer LLC, Burlingame, CA (US)

( * ) Notice: Subject to any disclaimer, the term of this patent is extended or adjusted under 35 U.S.C. 154(b) by 605 days.

(21) Appl. No.: 17/736,765

(22) Filed: May 4, 2022

(65) Prior Publication Data

US 2022/0358673 A1 Nov. 10, 2022

Related U.S. Application Data

(60) Provisional application No. 63/186,443, filed on May 10, 2021.

(51) Int. Cl.
*G06T 7/73* (2017.01)
*G06Q 10/0875* (2023.01)
(Continued)

(52) U.S. Cl.
CPC ........... *G06T 7/73* (2017.01); *G06Q 10/0875* (2013.01); *G06Q 30/0185* (2013.01);
(Continued)

(58) Field of Classification Search
CPC ............ G06T 7/73; G06T 2207/30108; G06Q 10/0875; G06Q 30/0185; G06Q 30/0601;
(Continued)

(56) References Cited

U.S. PATENT DOCUMENTS

2002/0059269 A1* 5/2002 McQuown ............. G06Q 10/10
2016/0019321 A1* 1/2016 Zahner ................... G06F 30/13
703/1

(Continued)

*Primary Examiner* — Christopher W Carter
(74) *Attorney, Agent, or Firm* — Run8 Patent Group, LLC; Peter Miller; Alexander Rodriguez

(57) ABSTRACT

One variation of a method for automatically registering and distributing modular computer component information and services through a network includes: accessing a device inventory identifying a set of modular computer components installed in a computing device; identifying a first modular computer component for installation in the first computing device, acquired from an online marketplace; identifying a second modular computer component within the first device, substitutable by the first modular computer component. In response to detecting substitution of the second modular computer component by the first modular computer component, in the computing device, appending the first modular computer component to the first device inventory. Additionally, identifying a third modular computer component combinable with the second modular computer component to complete a second computing device and generating a prompt to acquire the third modular computer component, or, alternatively, generating a prompt to list the second component for sale on the online marketplace.

20 Claims, 8 Drawing Sheets

(51) Int. Cl.
   *G06Q 30/018*   (2023.01)
   *G06Q 30/0601*  (2023.01)
   *G06V 10/77*    (2022.01)

(52) U.S. Cl.
   CPC ..... *G06Q 30/0601* (2013.01); *G06Q 30/0631* (2013.01); *G06V 10/7715* (2022.01); *G06T 2207/30108* (2013.01); *G06V 2201/07* (2022.01)

(58) Field of Classification Search
   CPC ........... G06Q 30/0631; G06V 10/7715; G06V 2201/07; G06V 20/20; G06V 10/225
   See application file for complete search history.

(56) References Cited

U.S. PATENT DOCUMENTS

| | | | |
|---|---|---|---|
| 2016/0082665 A1* | 3/2016 | Snyder | B29C 64/35 700/98 |
| 2020/0233391 A1* | 7/2020 | Ma | G05B 19/042 |
| 2021/0279381 A1* | 9/2021 | Bowen | G06F 30/12 |

\* cited by examiner

SYSTEM AND METHODS FOR AUTOMATICALLY REGISTERING AND DISTRIBUTING MODULAR COMPUTER COMPONENT INFORMATION AND SERVICES THROUGH A NETWORK

CROSS-REFERENCE TO RELATED APPLICATIONS

This application claims the benefit of U.S. Provisional Application No. 63/186,443, filed on 10 May 2021, which is incorporated in its entirety by this reference.

TECHNICAL FIELD

This invention relates generally to the field of personal computing and more specifically to a new and useful system and method for acquiring, assembling, repairing, maintaining, and reselling modular computer components in the field of personal computing.

DESCRIPTION OF THE EMBODIMENTS

Figure 1:
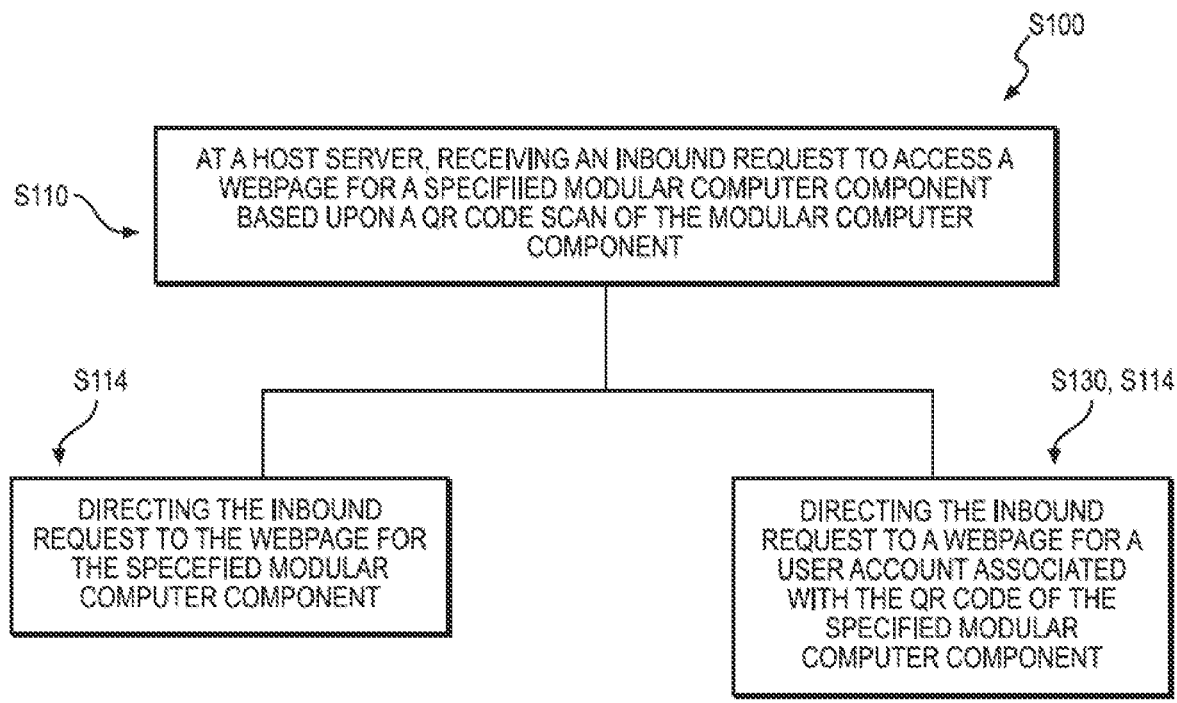
FIG. 1 is a flowchart representation of a method.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

Method

As shown in FIGS. 1-10, a method S100 and its variations for automatically registering and distributing modular computer component information and services through a network can include: at a host server, receiving an inbound request to access a webpage for a specified modular computer component based upon a QR code scan of the modular computer component in Block S110; and directing the inbound request to the webpage for the specified modular computer component in Block S114, wherein the webpage for the specified modular computer component includes instructions for installation and use of the modular computer component, suggestions for replacement parts or upgrades to the modular computer component, a marketplace of replacement parts or upgrades to the modular computer component, and a verification and validation of the authenticity of the modular computer component.

Alternatively, the method S100 can include directing the inbound request to a webpage for a user account associated with the QR code of the specified modular computer component in Block S114, wherein the webpage for the user includes: instructions for installation and use of the modular computer component in Block S120; suggestions for replacement parts or upgrades to the modular computer component; a marketplace of replacement parts or upgrades to the modular computer component in Block S150; and a verification and validation of the authenticity of the modular computer component in Block S132.

One variation of the method S100 includes: accessing a first device inventory identifying a first set of modular computer components installed in a first computing device of a first device type associated with a user in Block S132; and identifying a first modular computer component, of a first component type, for installation in the first computing device, and not currently installed in the first computing device in Block S110. The method S100 further includes identifying a second modular computer component of the first component type, in the first device inventory substitutable within the first computing device by the first modular computer component in Block S110. The method S100 further includes, in response to detecting a substitution of the second modular computer component by the first modular computer component in the first computing device: appending the first modular computer component to the first device inventory in Block S140; and appending the second modular computer component to a disjoined component inventory associated with the first user, the disjoined component inventory identifying a second set of modular computer components disjoined from the first device in Blocks S132, S140. Additionally, the method S100 can include: identifying a device template defining a target set of component types assemblable into a second device type in Blocks S130, S132; identifying a third modular computer component contained in the target set of component types and excluded from the disjoined component inventory in Blocks S132, S140; and generating a prompt to acquire the third modular computer component for combination with the second modular computer component to complete a second computing device of the second device type in Block S156.

In addition to the elements described above in the previous variation, another variation of the method S100 further includes, in response to receiving a selection of a first modular computer component from a user: accessing a disjoined component inventory associated with the first user and identifying a second set of modular computer components disjoined from the first device in Block S132; identifying a device template defining a target set of component types assemblable into a second device type in Block S134; identifying a third modular computer component of a second component type, contained in the target set of component types, and excluded from the disjoined component inventory in Block S136. The method S100 includes generating a prompt to acquire the third modular computer component for combination with the second set of modular computer components to complete a second computing device of the second device type in Block S156. Further, the method S100 can include, in response to detecting substitution of a second modular computer component by the first modular computer component in the first computing device in Blocks S140, S144, removing the second modular computer component from the first device inventory in Blocks S132, S140.

Figure 2:
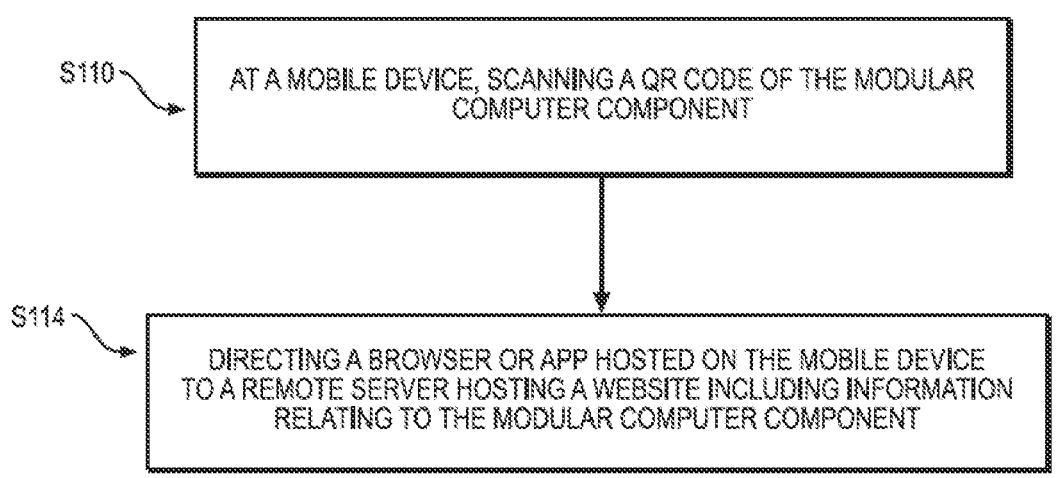
FIG. 2 is a flowchart representation of a variation of the method.

As shown in FIG. 2, one variation of the method S100 includes, at a mobile device, scanning a QR code of the modular computer component in Block Silo, and directing a browser or app hosted on the mobile device to a remote server hosting a website including information relating to the modular computer component in Block S114, wherein the webpage for the user includes instructions for installation and use of the modular computer component, suggestions for replacement parts or upgrades to the modular computer component, a marketplace of replacement parts or upgrades to the modular computer component, and a verification and validation of the authenticity of the modular computer component.

Figure 3:
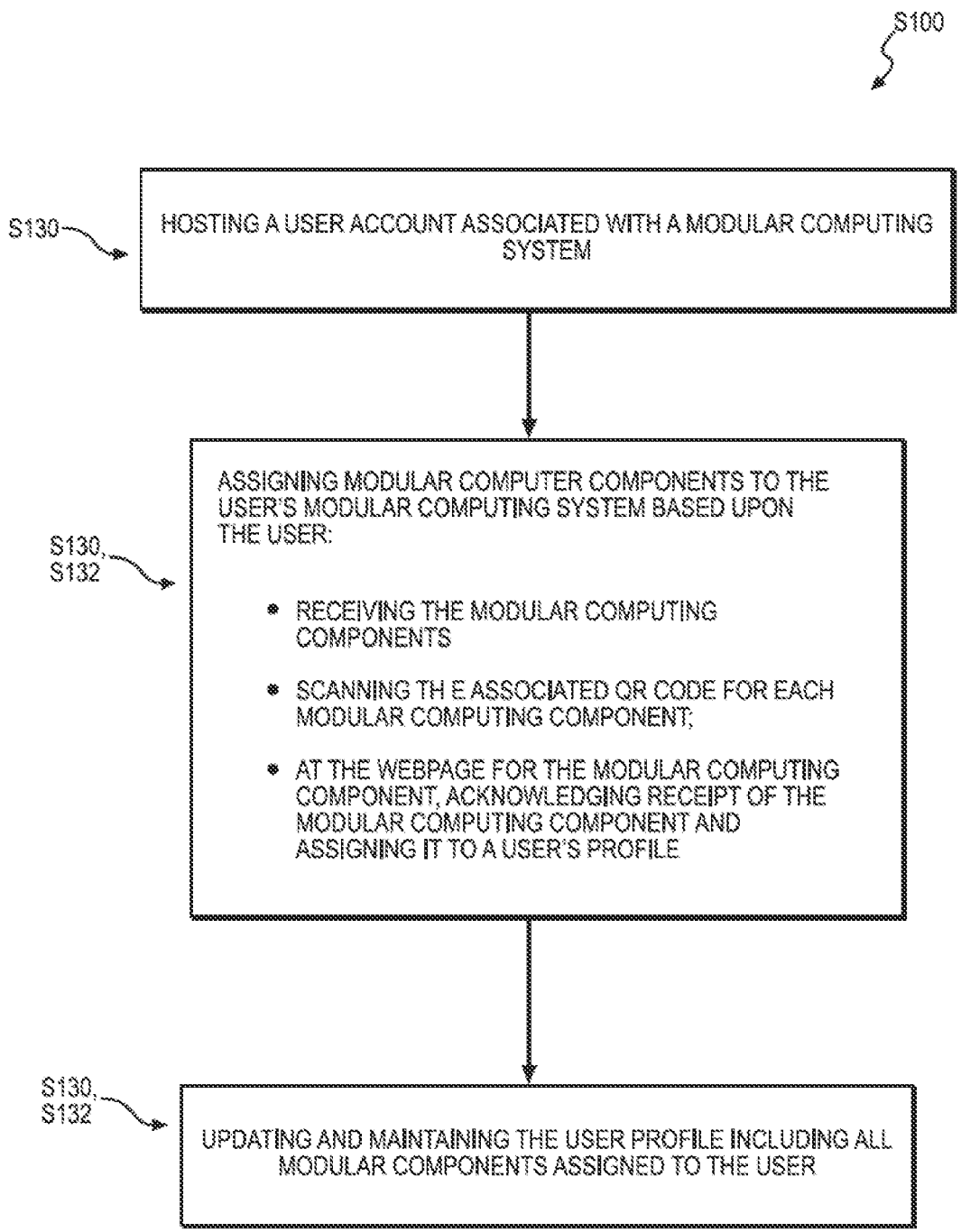
FIG. 3 is a flowchart representation of a variation of the method.

As shown in FIG. 3, another variation of the method S100 includes: hosting a user account associated with a modular computer system in Block S130; assigning modular computer components to the user's modular computer system in Block S132 based upon the user; receiving the modular computer components, scanning the associated QR code for each modular computer component, at the webpage for the modular computer component; acknowledging receipt of the modular computer component and assigning it to a user's profile; and updating and maintaining the user profile including all modular components assigned to the user in Block S132.

Figure 4:
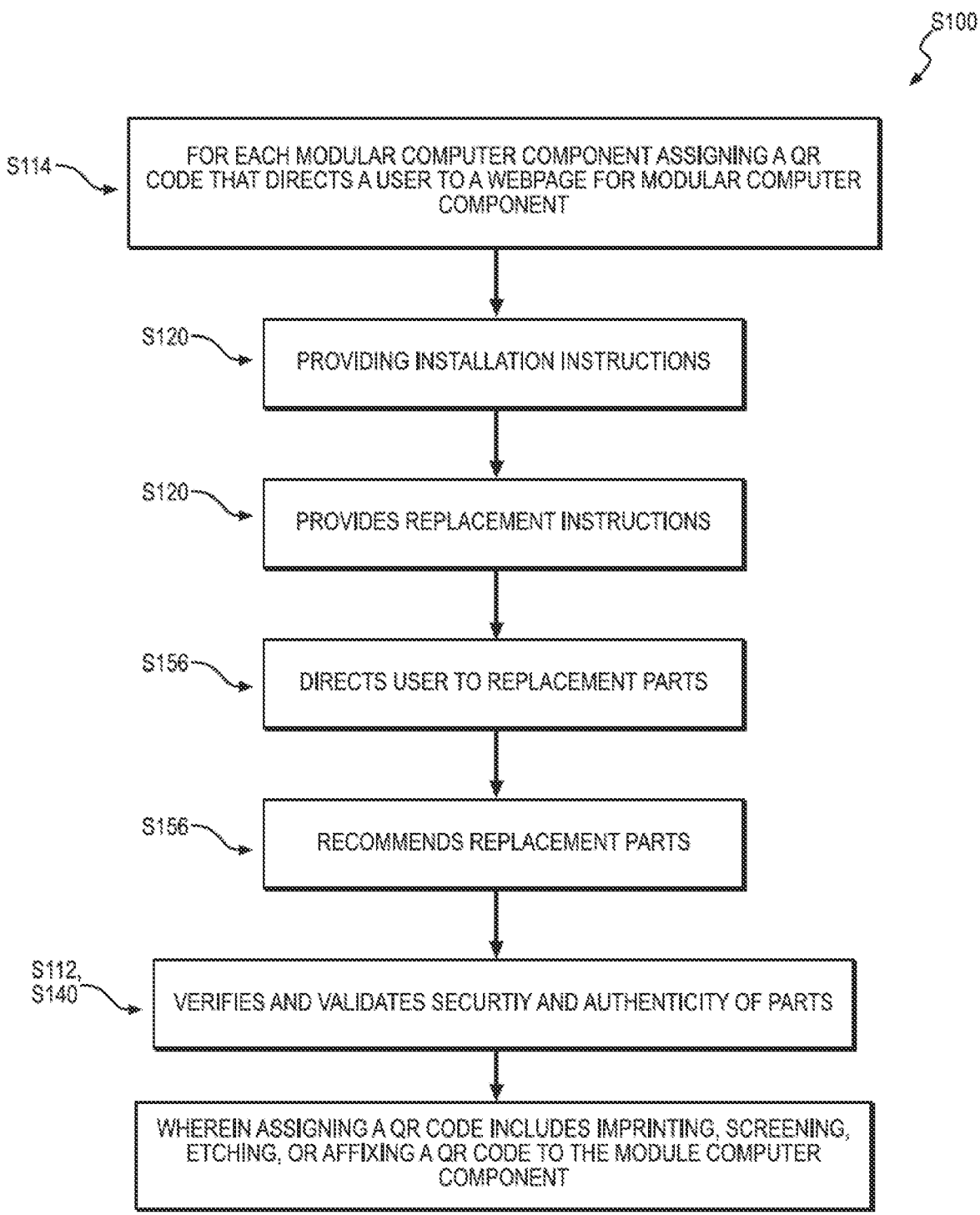
FIG. 4 is a flowchart representation of a variation of the method.

As shown in FIG. 4, another variation of the method S100 includes, for each modular computer component: assigning a QR code that directs a user to a webpage for modular computer components in Block S114; and, at the webpage for each component, displaying installation instructions in Block S120, S122, S124, displaying replacement instructions in Blocks S120, S122, S124, directing a user to replacement parts in Block S156, recommending replacement parts to a user Block S156, verifying and validating the security and authenticity of each of the parts in Blocks S112, S140, wherein assigning a QR code includes imprinting, screening, etching, or affixing a QR code to the modular computer component.

Figure 5:
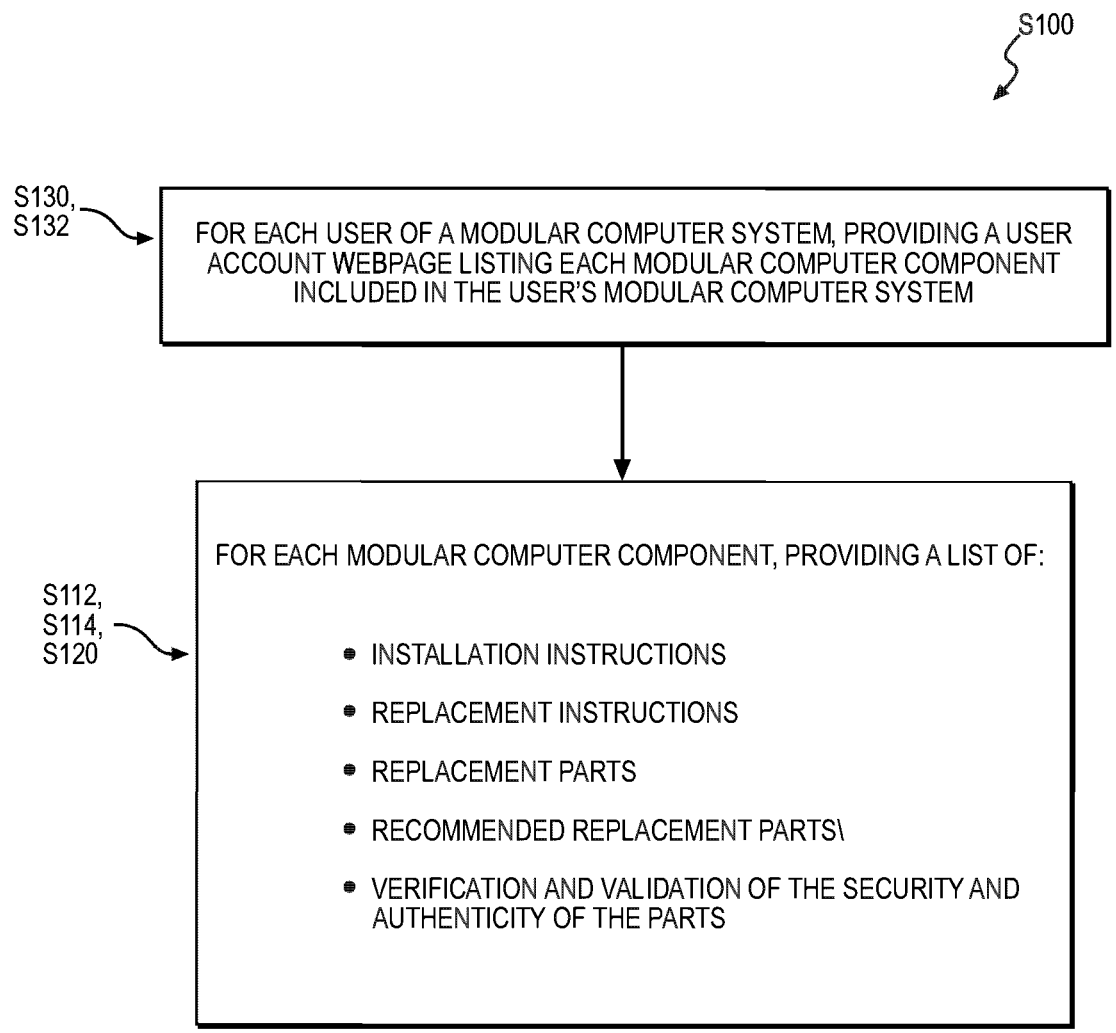
FIG. 5 is a flowchart representation of a variation of the method.

As shown in FIG. 5, another variation of the method S100 includes, for each user of a modular computer system: displaying a user account webpage listing each modular computer component included in the user's modular computer system in Block S130; and, for each modular computer component, displaying a listing including installation instructions in Block S120, replacement instructions, replacement parts, recommended replacement parts, and/or verification and validation of the security and authenticity of the parts in Blocks S112, S114.

Applications

Generally, Blocks of the method S100 can be executed by a remote computer system and/or an application executing on a local computer to guide a user in designing, building, buying, selling, upgrading, and/or replacing modular computer components within a computing device platform (e.g., a laptop computing device), such as to: customize the device to achieve performance targets in various performance domains; update select hardware within the device as new technologies become available (e.g., 5-versus 3-nanometer chip technologies); and/or replace worn or damaged modular computer components (e.g., a battery with more than 1,000 recharge cycles, a keyboard with worn keys). In particular, Blocks of the method S100 can be executed by a hosted computing platform that is internet-accessible by buyers, sellers, and users of modular computer components that make up modular computer systems.

A modular computer system can include a laptop chassis or frame and each of the other component parts as selected by the user, such as including a keyboard, a trackpad, a set of wired external communications ports, a set of wireless communications modems and processors, a battery, a display, processors (e.g., core and peripheral microprocessors), memory, storage, speakers, camera(s), etc. The modular computer system can be customizable, repairable, and upgradable by the user through replacement of existing modular computer components and the purchase of new modular computer components for her modular computer system.

The modular computer system chassis is configured to disassemble with no tools (e.g., via manually operable latches) or with basic tools (e.g., a screwdriver), thereby enabling a user to simply access the interior of the modular computer system chassis and replace select components. Accordingly, rather than replace an entire computing device, such as once per four-year interval, the user may instead selectively replace worn or obsolete components within the modular computer system over time, thereby: extending the average useful life of each individual component within the modular computer system (e.g., because only worn or obsolete components are discarded rather than the modular computer system as a whole); increasing the average performance of the modular computer system over its useful life; and enabling the user to better match the performance and accessibility of the modular computer system to her needs over the extended useful life of the modular computer system.

Generally, each modular computer component can include an optical or machine-readable identifier (e.g., a quick-response or "QR" code, a 1D barcode) imprinted, etched, adhered, or otherwise affixed to its external surface. The identifier (hereinafter referred to as "QR code") can include a pointer (e.g., a uniform resource locator, or "URL") to a particular website, webpage, database, or other online resource that contains information regarding the modular computer component, such as: a type of the component (e.g., a battery, a keyboard); a function(s) of the component; identifying component information (e.g., a unique identifier, a manufacturer, a batch number, a born-on date); textual, visual, animated, audible, and/or video instructions for installing the component in the modular computer system; troubleshooting guidelines; a user-registration portal; guidelines for replacement with newer component variants or component variants with different performance characteristics; access to a marketplace for buying, selling, and/or trading components of this type; and/or an augmented reality guide for identifying components within a modular computer system chassis.

In another variation of the method S100, the website can include or link to an online marketplace in which the user may buy, sell, or trade various components to reconfigure her computer. For example, the marketplace can include listings for new and/or used modular computer components, each of which is labeled with its own QR code: that identifies its component type, make, model, batch, and/or manufacturer, etc.; that uniquely identifies it among a population of components of the same type); and/or that validates its authenticity and availability for installation in the modular computer system chassis.

In another variation of the method S100, the hosted platform can store a user configuration that includes a listing or other depiction of each user's modular computer system (e.g., user accounts), including for each user a listing of current modular computer components, age of the current modular computer components, and a listing or other depiction of potential upgrades or replacements for each of the current modular computer components within each user's profile. The hosted platform can access a user profile to retrieve the set of modular computing components in a user's possession, a subset of modular computing components installed in a computing device, and a subset of modular computing components disjoined from any computing device. The hosted platform can also access a set of device templates, each device template defining a set of components required to assemble a computing device. The hosted platform can identify a modular computing component, present in the subset of disjoined modular computing components in the user profile, and also present in the device template. The hosted platform can then generate and transmit a prompt to the user to acquire the remaining modular computing components in the set of modular computing components in the device template to complete a second computing device. Additionally, the hosted platform can perform these steps in response to a user transaction on the hosted platform, such as purchasing an upgraded CPU to replace an existing CPU and presenting a set of components for the user to acquire to complete a second device using the existing CPU. In response to the user declining to acquire additional components to combine with the existing CPU, the hosted platform can prompt the user to list the component for sale on a marketplace of modular computing components.

Therefore, Blocks of the method S100 can be implemented by the online marketplace in conjunction with the modular computer system chassis to: reduce the environmental footprint of consumer electronics and personal computers; reduce longer-term ownership costs of high-performance machines; reduce lost productivity from infrequent updates of obsolete hardware; and reduce lost productivity and discomfort resulting from complete replacement of a machine containing only a subset of obsolete components. By enabling users, manufacturers, retailers, and distributors to repair, upgrade, adapt, and modify their computers over time as user needs change and/or as individual components wear or become obsolete, the online marketplace can reduce overall economic costs and environmental waste streams while also enabling users to access a customizable and longer-lasting personal computing device.

2.1 Example

For example, if a user perceives loss of battery capacity or verifies a loss of battery capacity with a system check at her modular computer system, the user may: open the chassis of the modular computer system; open a camera application on her smartphone; and sweep her smartphone across the interior of her modular computer system. The camera application may then read a QR code—on any one component in the modular computer system—that falls within the field of view of the camera; and then automatically open a browser-based augmented reality guide (or download a native augmented reality application for maintaining a modular computer system) linked to the QR code once confirmed by the user.

In one example, the augmented reality guide is applied to a static image captured by the camera application. In this example, the method S100 can include: accessing an image captured by the camera in the mobile device manipulated by the user after removing an access panel from the computing device; detecting a set of features in the image; and detecting a set of optical identifiers of modular computer components installed in the computing device. The method S100 can further include identifying the set of modular computer components, installed in the computing device, based on the set of optical identifiers, and populating the device inventory with the set of modular computer components.

In another example, the method S100 can include: accessing a live video feed captured by a camera in a mobile device manipulated by the user after removing an access panel from the computing device; detecting a set of features in the live video feed; and detecting a set of optical identifiers in the set of features. The method S100 can further include, for each optical identifier in the set of optical identifiers detected in the live video feed: identifying a modular computer component associated with an optical identifier, installed in the computing device; retrieving component attributes of the modular computer component; and rendering a set of augmented reality annotations, including the component attributes, within the live video feed proximal the location of the modular computer component within the live video feed.

In a variation of this example, the augmented reality guide can: access a live video feed from the camera; identify the modular computer system chassis and/or individual components populated in the modular computer system chassis based on QR codes detected in this live video feed; retrieve component information linked to these QR codes; and render augmented reality annotations—such as including component type, age, obsolescence, and/or recall flags for these components—over the live video feed, thereby quickly and seamlessly informing the user of the location of each component in the modular computer system chassis. Accordingly, the user may scan her smartphone over the modular computer system chassis until the augmented reality guide identifies and indicates—via augmented reality annotations—the location of the battery.

When the user selects (or "taps") this augmented reality annotation for the battery, the augmented reality guide can present a menu of options related to a battery-type component and/or linked to the battery's QR code, such as including: video installation instructions; battery disposal guidelines; battery troubleshooting content; battery maintenance tips; and webpage containing information regarding the battery (i.e., battery make and model, operations specification) within a modular computer system marketplace. When selected by the user, the augmented reality guide can access the battery page—populated with new and/or used batteries of the same type, size, and/or configuration (i.e., available for install in the modular computer system chassis)—within the modular computer system marketplace. The user may then navigate through this marketplace, select a battery, supply billing and shipping information, confirm an order for this replacement battery, close the augmented reality guide, and reassemble the modular computer system.

Later, when the user receives the new battery, she may: remove the new battery from its packaging; open the camera application on her smartphone; and point the camera at a QR code on the new battery. The camera application can then: read this QR code; and automatically open the augmented reality guide (or the native augmented reality application) linked to the QR code once confirmed by the user.

The augmented reality guide can then: access a live video feed from the camera; retrieve component information linked to this new QR code; and render an augmented reality option menu related to this battery. When selected by the user, the augmented reality guide can retrieve installation instructions for this battery, such as in the form of a text description, cartoon, animation, video, or augmented reality instruction manual. The user may then follow an installation instruction to replace the old battery in the modular computer system chassis with the new battery.

Therefore, the augmented reality guide can execute Blocks of the method S100 to: automatically detect components present in the modular computer system chassis as in Block S142; present a marketplace for new and/or used replacement components as in Block S150; and serve guidance for replacing components in the modular computer system chassis based on QR codes applied to these individual components and the modular computer system chassis as in Blocks S120, S122 and S124.

3. Modular Computer System

Figure 6:
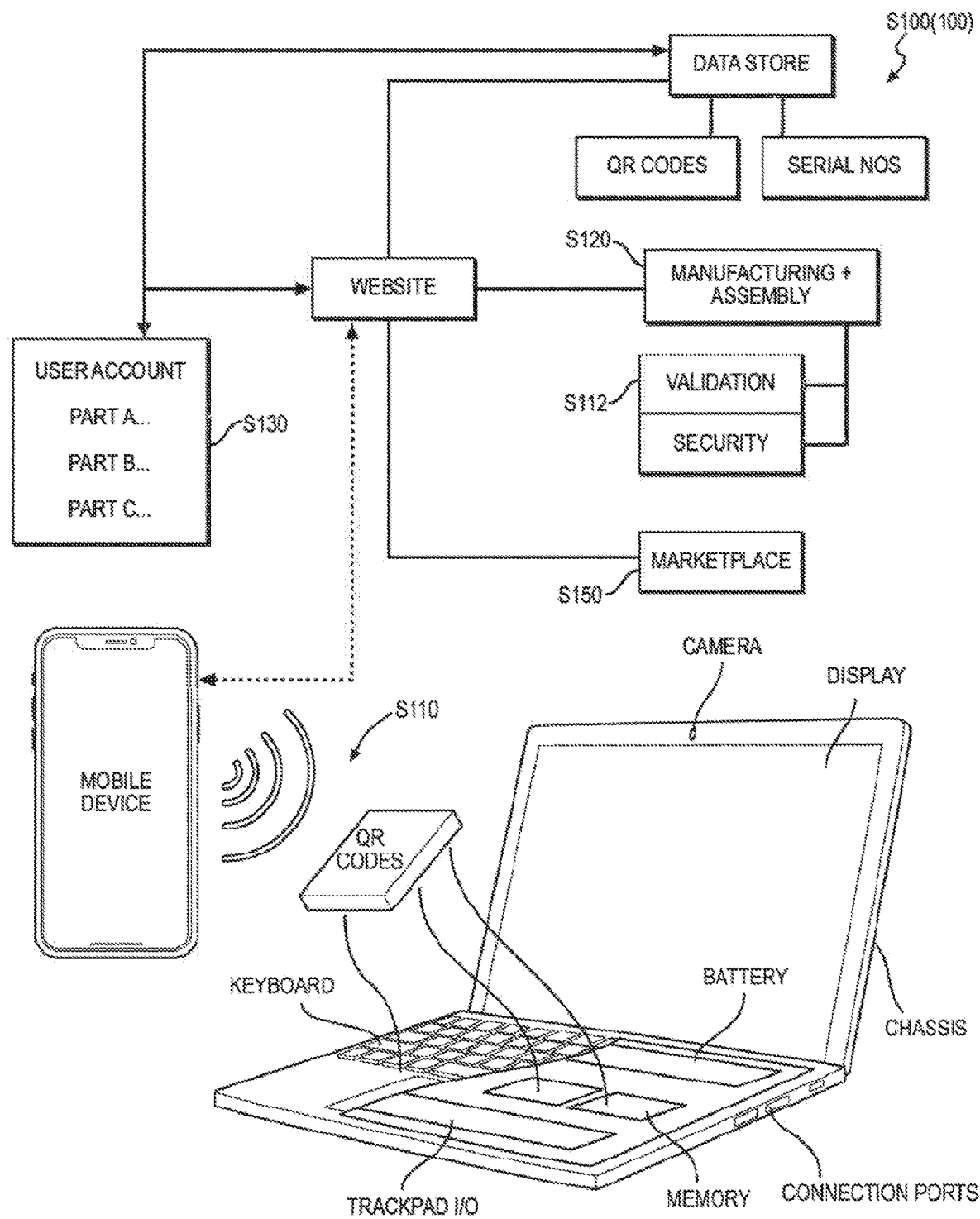
FIG. 6 is a schematic representation of a system.

Generally, the method S100 and its variations can be executed with or by a modular computer system that includes a set of modular computer components. As shown in FIG. 6, a modular computer system 100 can include: a chassis that houses or hosts a motherboard, CPU, or BUS; a set of communication ports and associated modems for wired and wireless communications; storage; memory; a battery; and a set of user interface input/output devices such as a display, keyboard, trackpad, camera, microphone, speaker, and touchpad.

As shown in FIG. 6, the modular computer system 100 can be configured for ease of access such that each modular computer component can be readily observed, accessed, installed, removed, and replaced in due course. As shown, each of the modular computer components can include a machine readable or machine-vision readable code, tag, or fiducial that identifies the modular computer component to another machine, for example a user's smart phone or tablet.

In one example implementation of the method S100 described herein, modular computer components of the system 100 can be associated with a quick response (QR) code that is machine readable by a digital camera on a user's smart phone or tablet (e.g., mobile device with imaging and internet capabilities). In this example implementation, the QR code for each modular computer component can contain information that, when captured by a user's mobile device, directs a browser application on the same mobile device to navigate to a webpage containing information regarding the modular computer component. As such, upon imaging a QR code for the battery module, the method S100 automatically directs the user's mobile device to open a web browsing application and to a particular web address associated with that battery. The webpage for that battery can then include a full suite of information regarding the battery, such as installation or removal instructions, how to determine degree of functionality, how to recycle or dispose of it, and how to upgrade or replace it.

Figure 7:
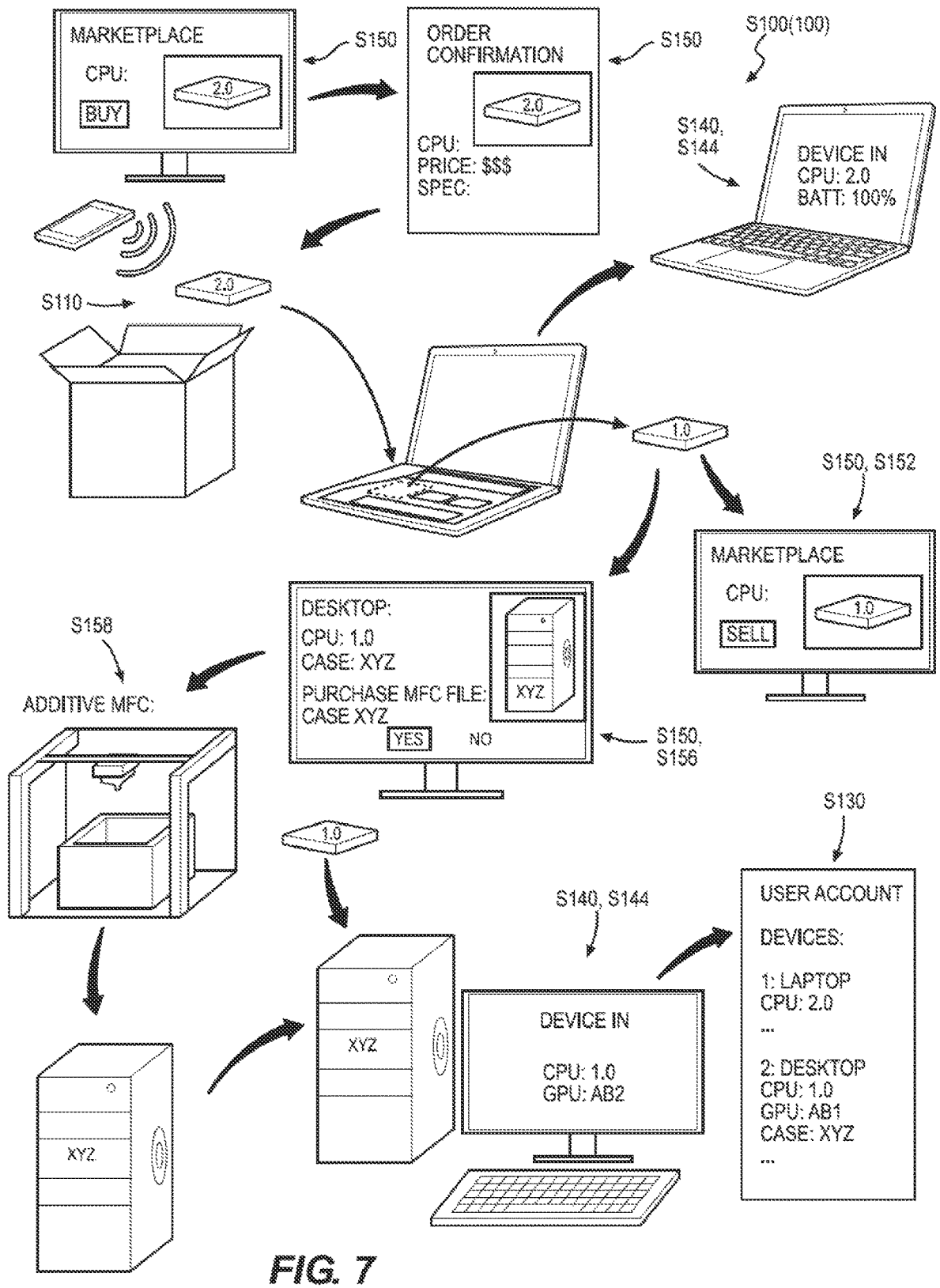
FIG. 7 is a flowchart representation of a variation of the method.

In another example shown in FIG. 7, the method S100 can identify a first modular computer component for installation in a computing device by: accessing an image captured by a camera in a mobile device manipulated by the user while unpacking the first modular computer component; detecting a set of features in the image; detecting a first optical identifier of the first modular computer component in the set of features; and identifying the first modular computer component based on the first optical identifier. The method S100 further includes transmitting the prompt to the mobile device in response to detecting substitution of a second modular computer component by the first modular computer component in the computing device.

Figure 8:
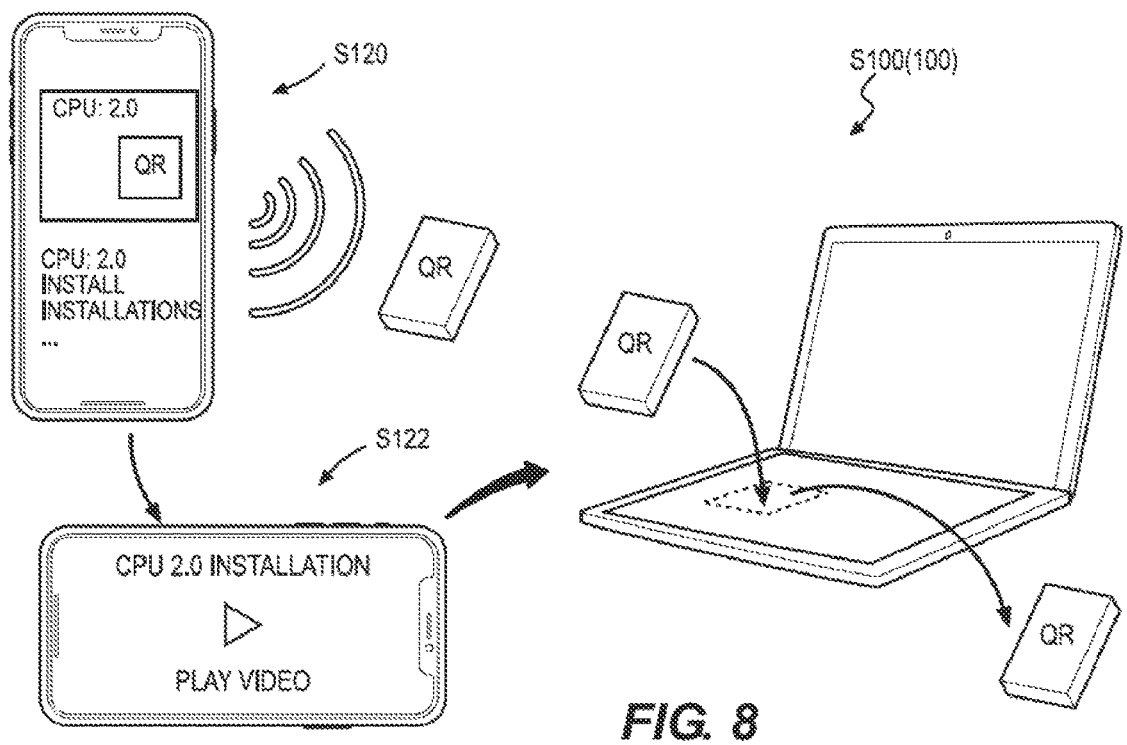
FIG. 8 is a flowchart representation of a variation of the method.
Figure 9:
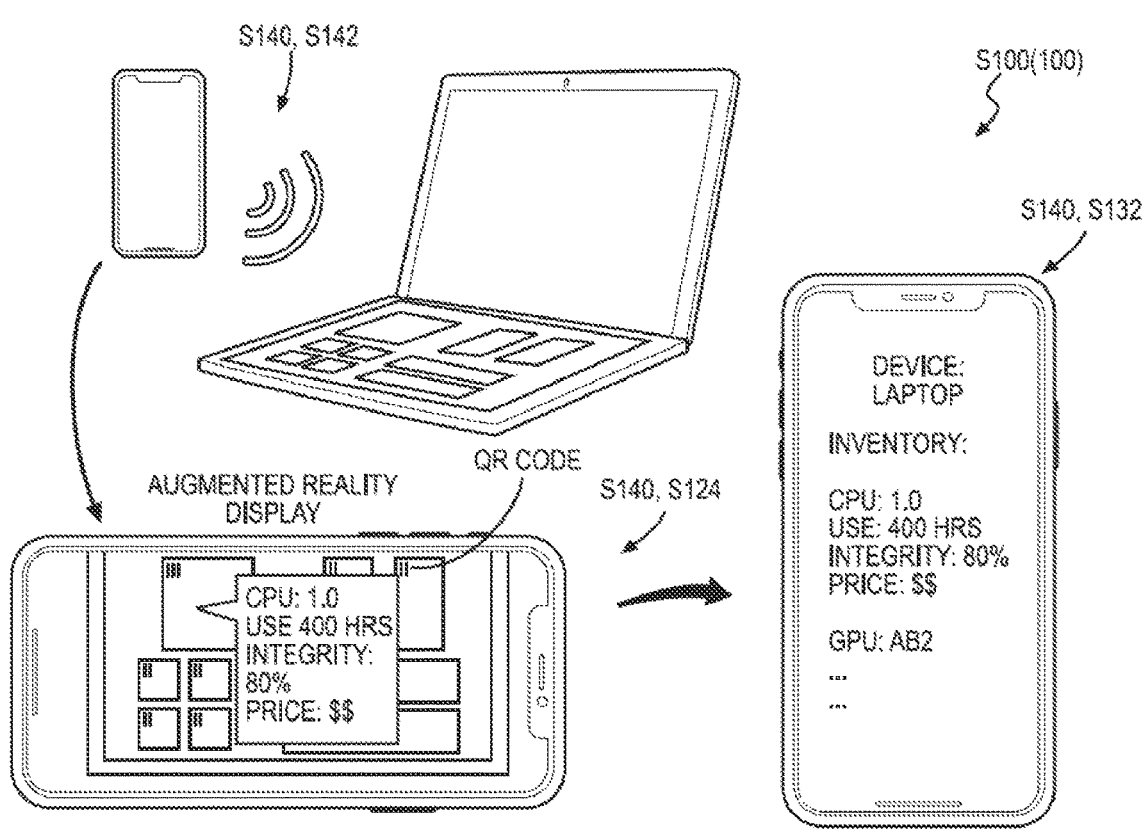
FIG. 9 is a flowchart representation of a variation of the method.

Additionally, as shown in FIG. 8, the method S100 includes, in response to identifying the first modular computer component based on the first optical identifier: retrieving a set of instructions for installation of the first modular computer component within the computing device; and rendering the set of instructions at the mobile device in Block S122.

In one variation of the example implementation, the user may scan multiple QR codes for multiple modular computer components, either by capturing multiple adjacent QR codes within a single image, capturing multiple QR codes in a string or series of still images, or by capturing multiple QR codes through a video or burst set of images.

In a multi-code capture variation, the browser of the user's mobile device can be directed to a user account page or user configuration page in which a set of modular computer component information links can be displayed for ease of access. Alternatively, the browser of the user's mobile device can be directed to a user account page or user configuration page in which the entire modular composition of the user's modular computer is shown or displayed, with links to additional pages for each of the modular computer components that make up the user's computer being displayed and readily available.

4. Acquisition and Registration

Generally, Blocks of the method S100 and its variations can be implemented in a distributed computing environment including a modular computer system 100 of the type shown in FIG. 6. As shown in FIGS. 1-10, the system 100 can execute Blocks of the method S100 and its variations in a distributed computing environment including various databases, servers, websites, user interfaces, and machine-machine interfaces (e.g., through optical scanning of modular computer components). As described further below, the method S100 and its variations can be executed by one or more components of the system 100 at or by various computing systems, including a hosted website/server, a user's mobile device, a hosted electronic marketplace for modular computer components, a user account configuration tool, a manufacturing and distribution database, and a data store that records and stores identifying information regarding each modular computer component.

In one variation of the method S100, a customer can interface with a hosted website that builds-to-order a modular computer system 100 that includes user-specified modular computer components. In this variation of the method S100, each modular computer component can be associated with a specified QR code. In another implementation, the system 100 can assign the QR code to each modular computer component as it is ordered, (i.e., by automatically placing, etching, adhering, or otherwise affixing a QR code to a specific modular computer component in response to ordering by the customer). In another implementation, each modular computer component can be imported into the system 100 with the QR code having already been affixed or assigned to the modular computer component, either at the point of manufacture, point of distribution, or point of receipt at the system 100.

For example, a distributor can receive a batch of modular computer components (e.g., batteries) and, prior to retail sale, the system 100 can identify a serial number, date of manufacture, place of manufacture, and lot/batch number for each battery. The system 100 can further generate QR codes for each battery. Upon affixing the physical QR code to the battery, the latter can be offered for retail sale and end use by the user.

The system 100 can further execute Blocks of the method S100 by maintaining a data store that includes a library, data set, or database of each modular computer component, to include: a description; identifying information (e.g., serial number, date of manufacture, place of manufacture, lot/batch number); assigned QR code; and a website or web address to which the QR code will redirect a customer's mobile device browser. In one variation of the implementation, the library can additionally include a component record corresponding to an individual modular computer component and include a record of consumption activity of the modular computer component in Block S112. The consumption activity data can be aggregated into an integrity status of the modular computer component by the system 100. In one alternative implementation, the data store can also include a modular computer component registration and tracking dataset, through which the system 100 can: verify and authenticate the provenance of the modular computer component and, through cross-reference of the serial number, date/site of manufacture, and date of first retail sale; and validate the authenticity and safety of the modular computer component to its first and subsequent purchasers.

In another variation of the implementation, the component record can include consumption activity of a modular computer component defining a duration of time the component has been in use in a computing device in Block S112. A consumption model defining degradation of a modular computer component can be applied to the recorded consumption activity in the component record to derive an integrity status of the modular computer component. The integrity status can be accessed by the system 100 in Blocks S112, S114 of the method S100 to determine the condition of a particular modular computer component, and/or prompt the user to execute an action based on the integrity status, such as selling or recycling a component. Additionally, when a user creates a listing for a particular modular computer component to be sold on the online marketplace, the system 100 can execute Blocks S112, S114 to check the integrity status of the particular modular computer component prior to allowing the user to complete and post the listing in Block S152.

In one example, the method S100 includes, prior to substitution of a second modular computer component by a first modular computer component in a first computing device: detecting consumption activity of the second modular computer component during use in the first computing device; and storing consumption activity of the second modular computer component in a component record corresponding to the second component in Block S112. The method S100 further includes: estimating an integrity status of the second modular computer component based on the component record. In response to the user declining acquisition of a third modular computer component, based on a prompt to acquire the third modular computer component to combine with the second modular computer component and thereby complete assembly of a second computing device, the method S100 includes: generating a marketplace listing for the second modular computer component; populating the marketplace listing with the integrity status of the second modular computer component; and loading the marketplace listing onto the online marketplace in Block S152.

In a variation of this example, the method S100 further includes, in response to a time duration of the marketplace listing of the second modular computer component present on the online marketplace exceeding a threshold time duration: generating a second prompt to acquire the third modular computer component for combination with the second modular computer component to complete the second computing device and serving the second prompt to the user in Block S154.

In another implementation, the system 100 can execute Block S150 of the method S100 by hosting an online marketplace for new or second-hand modular computer components. As noted above, by initially assigning the QR code to each modular computer component, the system 100 can verify and authenticate the provenance of each modular computer component, which in turn can increase the salability and longevity of each modular computer component as they can be used, sold, bought, and reused over a longer period of time by a greater number of users, each of whom is assured of the quality and authenticity of the modular computer component they are acquiring.

5. Installation and Repair

The system 100 can execute Blocks of the method S100 at a mobile device of a user by: scanning or imaging a QR code assigned to a modular computer component; and then, through a browser or other application on the mobile device, directing the user to a remote server hosting a website or webpage associated with the modular computer component. In one variation of the system 100 and method S100, the remotely hosted website or webpage can include information related to the imaged product as a type or class of product, (e.g., a battery, a keyboard, a memory module, a camera, etc.). Alternatively, the remotely hosted website or webpage can include information relating to the specific modular computer component itself, (e.g., a distinct URL or web address assigned to the QR code of the particular modular computer component). In this alternative implementation, the remotely hosted website or webpage can also include a security requirement (such as a user account and password combination) to access the information on the remotely hosted website or webpage, as it is specific to the modular computer component imaged by the user.

The system 100 can execute Blocks of the method S100 by displaying, on the remotely hosted website or webpage, information relating to the modular computer component associated with the imaged QR code in Block S114. The information can include a type of part, its function, date and place of manufacture, serial number, written instructions for installation or removal, video instructions for installation or removal, answers to frequently asked questions, options for repair or replacement of the part, disposal or recycling options for the part, suggestions for replacement parts, and a link to the marketplace for resale of the part and purchase of a replacement or upgrade part.

For example, the method S100 can include rendering the set of instructions at the mobile device by playing a prerecorded video depicting: partial disassembly of a demonstration computing device of the first computing device type; removal of a second modular computer component from the demonstration computing device; installation of a first modular computer component within the demonstration computing device; and reassembly of the demonstration computing device in Block S122.

In one alternative, the method S100 can include: accessing a video feed from a camera integrated into or connected to the device; scanning the video feed for QR codes; and retrieving information relating to the modular computer component based on or linked to detected QR codes in Block S142. Upon QR code recognition, the mobile device can: automatically open a browser or associated application; and direct it to the website or webpage associated with the detected QR code. The user can then navigate through the assorted information hosted on the website or webpage in order to learn how to install, remove, or replace the modular computer component in her computer. As noted above, the website or webpage can include additional information regarding the associated modular computer component, including a link to the marketplace for resale of the part and purchase of a replacement or upgrade part.

The host server can receive a request from a user's mobile device browser to access a hosted website or webpage relating to a modular computer component. The incoming request can contain or include information, such as a particular URL or alphanumeric code that identifies the request as coming from a detected QR code associated with the host server. Upon receipt and validation of the incoming request, the host server can direct the user's mobile device browser to a product page that includes information or links relating to the modular computer component. Alternatively, upon receipt and validation of the incoming request, the host server can direct the user's mobile device browser to a user account page that is unique to the user and includes information or links relating to one or more of the modular computer components associated with the user. The host server can also host relevant information, links, or media relating to the modular computer component associated with the particular QR code.

In another variation of the example implementation, the host server can receive a request from an application running on the user's mobile device to access a user account page that is assigned to the user and that includes information relating to each modular computer component in the user's possession (i.e., a user profile). As noted above, the incoming request can contain or include information such as a particular URL or alphanumeric code, that identifies the request as coming from a scanned QR code associated with the host server. Upon receipt and validation of the incoming request, the host server can direct the user's mobile device application to the user account page that is unique to the user and includes information or links relating to one or more of the modular computer components associated with the user. The host server can also host relevant information, links, or media relating to the modular computer component(s) associated with the user's account, which is, in turn, associated with a set of QR codes for the set of modular computer components in the user's possession as contained in the user profile.

In another variation of the example implementation, the modular computer system can automatically detect installation of a modular computer component into, and removal of a modular computer component from, the modular computer system in Block S144 and automatically create and update a component record for the component installed in Block S112. For example, the method S100 can include, at a computing device, in response to the computing device transitioning from an inactive state to an active state: reading a component identifier from a data interface on a first modular computer component; and detecting substitution of a second modular computer component by the first modular computer component in a computing device based on the component identifier. The method S100 further includes, in response to detecting substitution of the second modular computer component by the first modular computer component in a the computing device: initiating a component record for the first modular computer component; writing a device identifier of the first computing device to the component record; detecting consumption activity of the first modular computer component at the first computing device; and storing consumption activity of the first modular computer component in the component record in Block S112.

6. Marketplace

Figure 10:
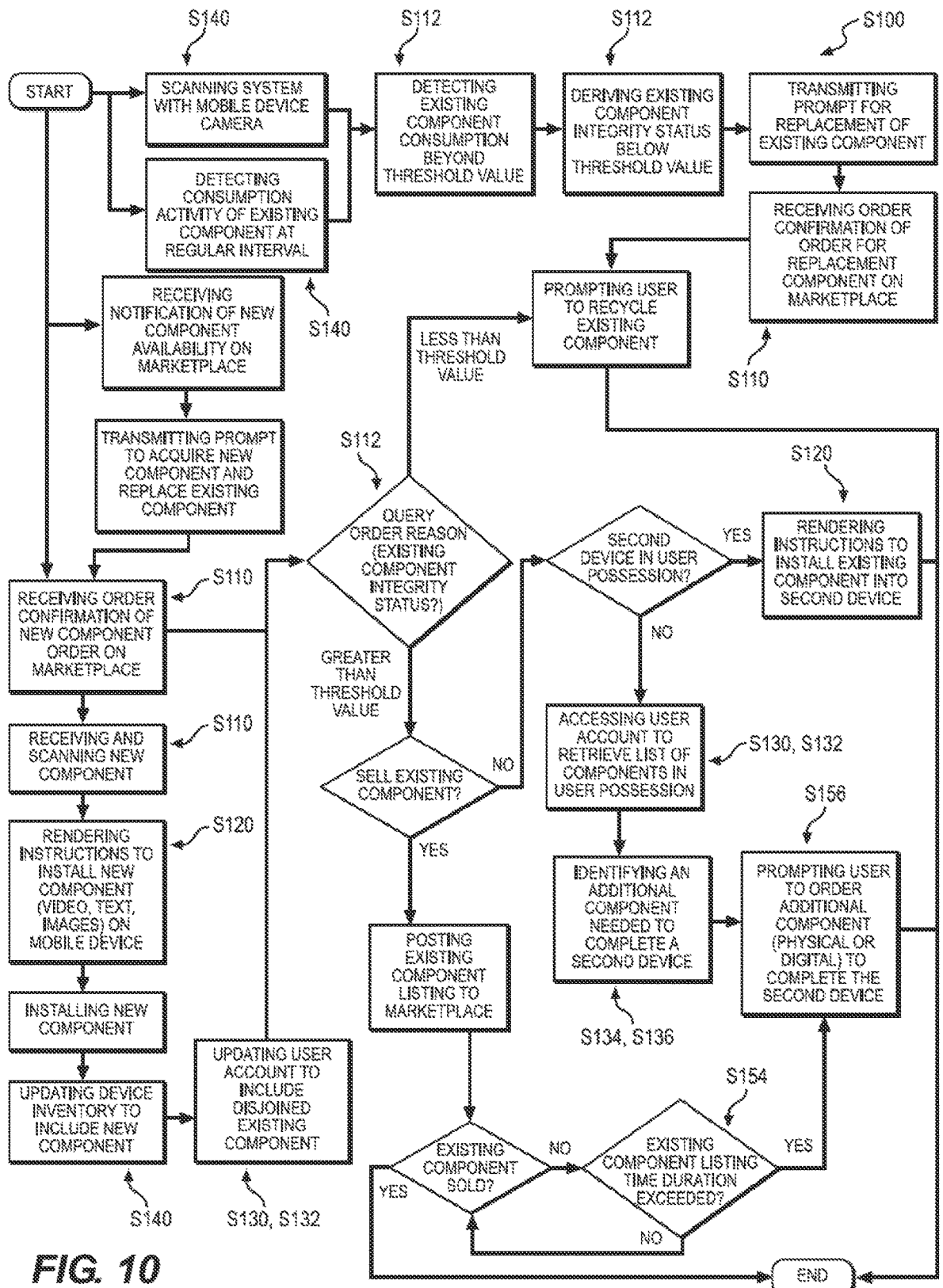
FIG. 10 is a flowchart representation of a variation of the method.

As shown in FIGS. 6, 7, and 10, the system 100 can execute Blocks of the method S100 to direct a user to a marketplace for new or used modular computer components based upon a scan of a QR code of a modular computer component in possession of the user. The marketplace can include a web-based and networked server or set of servers that host a set of websites or webpages accessible by users through their respective browsers or dedicated apps. In example implementations described below, the marketplace can function as a trusted forum for the purchase, sale, or trade of new and used modular computer components. As described in further detail below, the marketplace can be configured to only permit transactions for modular computer components that are trusted through initial registration of the modular computer components and association with its QR code and its user(s). In other example implementation, the marketplace can be accessed directly through a mobile device of a buyer or seller via direct imaging of a QR code. Alternatively, the marketplace can be accessed through a user account associated with a set of QR codes and through any browser platform, including through the modular computer itself. Additionally, the system 100 can execute Blocks of the method S100 to track the acquisition of modular computer components by a user based on orders placed on the online marketplace by a particular user associated with a user profile.

For example, the method S100 can include: identifying a first modular computer component for installation in a computing device by receiving, at an online marketplace, an order for the first modular computer component of the first component type submitted by the user in Block S156. The method S100 can further include, in response to receiving the order and prior to confirming the order for the user: serving a prompt to acquire a second modular computer component to the user via the online marketplace; and, in response to receiving confirmation of the prompt from the user, appending the second modular computer component to the user's order at the online marketplace in Block S156.

In another example, the system 100 can execute Blocks of the method S100 to provide a digital file including instructions for the manufacture of a modular computer component via the online marketplace. For example, the method S100 can include: identifying the second modular computer component defining a desktop computer housing; generating a prompt to acquire the second modular computer component in the form of a digital file representing a digital model of the desktop computer housing; and instructions for manufacture of the desktop computer housing, according to the digital model, at an additive manufacturing device in Block S158.

6.1 QR Buyer Access

Generally, a user may access the marketplace through a mobile device by scanning a QR code of a modular computer component within her laptop. As noted above, the system 100 can execute Blocks of the method S100 by directing the user's mobile device to access a website or webpage associated with the modular computer component, via the mobile device browser or a dedicated app. The mobile device can then display a product page associated with the QR code or a user account page associated with the user who, in turn, is associated with the scanned QR code. In one variation of the system 100 and method S100, the marketplace can be accessed via a link on the product page or the user account page.

In general, the marketplace server can suggest upgrades, additions, or replacement parts for each selected modular computer component, whether selected directly via QR code scan or via selection on the marketplace website. For example, if the selected modular computer component is a memory module, then the marketplace can list items for sale such as including additional memory modules of the same capacity, upgraded memory modules of increased capacity, and other upgrades adjacent to a memory upgrade (e.g., improved graphics processors).

In another example, the marketplace server can detect previous transactions completed by a user on the marketplace to, within the user account, assemble a user profile defining a set of modular computing components in a user's possession based on records of previous purchases by a user on the marketplace. The marketplace server can access a device template defining a set of components required to assemble a computing device, such as a desktop computer tower. The marketplace server can access the user profile to retrieve the set of components in the user's possession and cross-reference the set of components in the user's possession with the set of components required to assemble the desktop tower and identify a subset of components the user must acquire to complete the desktop tower. The marketplace server can then generate and serve a prompt to the user including a targeted recommendation to acquire modular computing components within the subset of components required to complete the desktop tower.

In a related example, the user accesses the marketplace and completes a purchase of a new CPU component for a laptop device. Upon receipt and unpackaging, the user scans the QR code on the new CPU component and receives instructions to install the new CPU in the laptop device. After successful installation, the user now has the old CPU, taken from the laptop device after substitution with the new CPU component, in her possession. The user can scan the QR code on the old CPU, and the user profile detects the old CPU now disjoined from the laptop device, updates the laptop device inventory, and appends the old CPU to the user's disjoined inventory. Alternatively, the system 100 can implement blocks of the method S100 to automatically detect the new CPU installed in the laptop device upon activation of the laptop device, and derive the old CPU as now disjoined from the laptop device.

In response to detection of the old CPU disjoined from the laptop device by the system 100, the marketplace server can access the user profile to identify the old CPU as disjoined from a device, access a device template for a desktop tower, and identify the old CPU as a modular computing component in the set of components necessary to complete the desktop tower. The marketplace server can then generate and transmit a prompt to the user to acquire the remaining components in the set of components required to complete the desktop tower. The preceding steps can be repeated each time a user acquires a modular computing component to generate and serve prompts to acquire the remaining modular computing components necessary to complete additional devices.

In one variation of the example implementation, the marketplace can also display links to other users in the larger modular computer component ecosystem who also purchased the requested or suggested replacements or upgrades. For example, if User A enters the marketplace via a QR scan of a trackpad QR code, then the marketplace can automatically display links to additional trackpads that are for sale by other users within the marketplace. As described in more detail below, the marketplace can also transmit a link to the user, directing the user to the marketplace to sell the trackpad that is being replaced on the marketplace.

In another variation of the example implementation, the marketplace can feed suggested recommendations or items available for purchase to the user's account webpage for display to the user. In this variation, when the user accesses her user account, which includes the complete QR-specific build of her laptop, the marketplace can push suggested upgrades and replacements directly to the user's webpage, in order to display items available for purchase in the marketplace. For example, as User A enters her account webpage and views a complete build of her laptop, the marketplace can push notification of items available for purchase that can improve the performance of her laptop, without the user specifically requesting a new modular computer component based upon a QR scan.

Therefore, the marketplace server can: track the current state of a user's build; track the acquisition of modular computing components by the user; and generate and transmit targeted recommendations to the user, based on the user's actions, to acquire additional modular computing components that complement the user's current set of modular computing components (e.g., by upgrading a current device with additional or enhanced capability, enabling the user to complete additional computing devices.)

6.2 QR Seller Access

In another variation of the example implementation, the system 100 can execute Blocks of the method S100 by permitting selected modular computer components to be sold on the marketplace. Generally, the marketplace can require that listed items must be pre-registered with the marketplace platform and related data stored via serial number and QR code, thus ensuring that only trusted items are available for sale via the marketplace.

In this variation of the example implementation, if a user desires to sell a product, then she can scan the QR code of the associated product, and the QR code can direct her mobile device browser or app to the webpage of the associated product. On the webpage for the associated product, the marketplace can transmit to the user options to buy, sell, or trade the associated product. If the user selects sell or trade (e.g., the user wishes to make the product available to other users), then the marketplace can verify the provenance of the product prior to allowing the user to list it.

In this variation of the example implementation, the marketplace can interface with the data store in order to check the information in the scanned QR code with the known or registered data relating to the product, including its serial number, date of manufacture, place of manufacture, and lot number. If the marketplace and the data store are able to confirm the veracity and authenticity of the product, then the marketplace can notify the user that the product is appropriate for transaction and listing on the marketplace. In another implementation, the marketplace can display a link or button displayed to the user that allows the user to automatically list the product on the marketplace via user acknowledgement. In another implementation, the marketplace can prompt the user to select a selling price and particular shipping and/or handling requests or requirements. In yet another implementation, the marketplace can prompt the user to select a predetermined price derived from past and current sales of similar components on the marketplace.

6.3 User Account Access

In another variation of the system 100 and method S100 described herein, the marketplace can be accessed by a set of users through separate sign in and authentication procedures not related to scanning a single QR code associated with a product. For example, each user may establish a user account that includes the data associated with the modular computer components in her possession, including the QR code link(s), serial number, date of manufacture, place of manufacture, and lot number. In this example implementation, each user has a unique account that stores and lists the validated and trusted components in her possession. In one variation, the user may set up her user account upon first purchase of a modular computer system of the type described herein. For example, the system 100 can execute Blocks of the method S100 to establish an initial user account for each user including the identifying information for each modular computer component included in the initial purchase. In another implementation, the user may scan an initial system-level QR code or input some other form of authentication and possession of the system to establish the link between the system 100, the modular computer components, the user, and the user account. Once established, each corresponding modular computer component for sale in the marketplace can be both validated and associated with that user.

Generally, the system 100 can execute Blocks of the method S100 by permitting a user to access the marketplace through a user-account-based sign in, rather than by scanning a QR code. In this example implementation, each user account can access the marketplace for the sale, purchase, or trade of modular computer components. In another implementation, the user accounts and marketplace can be accessible through a user's modular computer itself, (e.g., through a web browser or app running on the modular computer). In another implementation, the user accounts and marketplace can be accessed through any browser or app running on any computing device, including the user's mobile device and modular computer, with appropriate sign-in and authentication procedures.

In another example implementation of the system 100 and method S100, the marketplace can interface with the user's account to automatically update a status of the user's modular computer build. For example, if the user sells a first modular computer component defining a 256 GB storage drive on the marketplace and also acquires a second modular computer component defining a 1 TB storage drive on the marketplace, the marketplace can send a notification to the user account that the first modular computer component has been sold and the second modular computer component has been acquired. The marketplace can further interface with the user account to automatically update any additional information relating to the newly acquired modular computer component, such as its QR code link(s), serial number, date of manufacture, place of manufacture, and batch/lot number. In a variation of the example implementation, the marketplace can also interface with the user account to notify the user of a change in modular computer components (e.g., sold and bought) and ask the user to verify the new addition to her system through a scan of the QR code associated with the new modular computer component.

In another variation of the example implementation, the update from the marketplace to the user account will permit the user to directly access information relating to the newly acquired product via scanning its QR code, as described in detail above. That is, the marketplace can interface with the user account to automatically update the association between the QR code and the user account such that subsequent scans of the modular computer component's QR code will direct the scanning device to the user account as updated by the marketplace.

In another implementation, the online marketplace can automatically notify a user of a newly released modular computer component or an upgraded version of a component type in a user's possession, based on the user profile, and prompt the user to acquire the newly released modular computer component. For example: the method S100 can include: in response to initial availability of a first modular computer component via an online marketplace, access a device inventory identifying a set of modular computer components installed in a computing device of a first device type in Block S140; in response to identifying a second modular computer component of the first component type by accessing a first characteristic of the first modular computer component, access a second characteristic of the second modular computer component; and, in response to the first characteristic exceeding the second characteristic by more than a threshold upgrade difference, identify the second modular computer component for substitution within the computing device by the first modular computer component in Block S114. The method S100 additionally includes generating a prompt to acquire the first modular computer component for substitution of the second modular computer component to upgrade the first computing device.

6.3.1 User Device Management within User Account

Generally, the system 100 can execute Blocks of the method S100 to record and manage the set of modular computer components in a user's possession by tracking the orders placed and modular computer components scanned by a user, and/or by receiving electronic updates from a computing device associated with a user's account based on the modular computer components installed within the computing device. The system 100 can execute Blocks of the method S100 to maintain a list of devices in a user's account based on direct verification of an operable device via a scan of a computing device in Block S142, and/or via receipt of a verification signal from a computing device in Block S144. Additionally, the system 100 can execute Blocks of the method S100 to derive a computing device that may be in the user's possession or, estimate a device that could be completed by a user, based on the set of modular computer components associated with the user's account.

For example, the method S100 can include creation and maintenance of a device inventory representing the components installed in a particular modular computer system in Block S140. Generally, the device inventory is associated with a particular device represented in the user profile of a particular user. A user profile can include representations of multiple devices in possession of the particular user. The method can also include detection of a newly assembled computing device from modular computer components, generating a new device inventory representing the newly assembled device, and associating the new device inventory to the user profile in Blocks S140, 144.

For example, the method S100 can include, in response to activation of a second computing device: detecting assembly of a second modular computer component and a third modular computer component to complete the second computing device of the second device type; removing the second modular computer component from the disjoined component inventory; and generating a second device inventory identifying a second set of modular computer components installed in the second computing device, the second device inventory including the second modular computer component and the third modular computer component in Block S140. The method S100 can then also associate the second device inventory to the user profile in Blocks S130, S132.

In particular, the method S100 includes identifying a first modular computer component comprising a central processing unit for installation in the first computing device, the first computing device defining a laptop computer and identifying the device template defining the target set of component types assemblable into the second device type as defining a desktop computer tower.

Therefore, the method S100 can be executed with or by a modular computer system that includes a set of modular computer components and can track the set of components and the devices associated with a particular user via a user profile. The method S100 can also include automatic detection of the installation and/or removal of components from an individual computing device, independently and positively verifying the state of a computing device without input from a user. The system can automatically manage device inventories of devices associated with a user profile to reduce errors and accurately communicate a current state of a user's inventory of components and devices at an external system.

7. Security and Validation

As shown in the FIGURES, the system 100 can execute Blocks of the method S100 to ensure that modular computer components are verifiably safe and authentic pieces of hardware upon which a user may rely. In one example implementation, the method S100 can include registering or associating the QR code of the modular computer component with its serial number (or other unique identifier) at the data store, which in turn is selectively accessible by other elements of the system 100 including the mobile device and the marketplace. Alternatively, the method S100 can also include registering or associating the QR code of the modular computer component with additional information relating to the component, such as its date of manufacture, place of manufacture, lot number, batch number, and any additional information pertinent to its manufacture and distribution.

Alternatively, the method S100 and the system 100 can store, access, and transmit the collective identifying information (e.g., serial number, date of manufacture) to generate a security profile of the modular computer component that uniquely identifies the modular computer component for authentication using a set of the identifying information. In one example implementation, the system 100 can execute Blocks of the method S100 by storing the registration of the identifying information and the QR code of the modular computer product in the data store such that it is selectively accessible via a browser on a mobile device in response to a scan of the QR code. In one variation of the example implementation, on an initial scan of the QR code, the mobile device will direct the user to a website or webpage relating to the modular computer component and then query the user to verify or validate certain other information (e.g., a serial number on the modular computer component). Upon entry of an element of identifying information by a user, the system 100 can execute Blocks of the method S100 by checking that both the QR code scanned and the subsequent user-entered element of identifying information match corresponding information related to the modular computer component stored in the data store.

Additionally, the method S100 and the system 100 can store, access, and transmit usage information of the modular computer components to track consumption and use of the modular computer component within a modular computer system. At the point of transaction of a component (i.e., offer for sale of a modular computer component on the online marketplace) the system 100 can execute Blocks of the method S100 to verify an integrity status of the particular modular computer component to validate the condition of the modular computer component prior to resale at the online marketplace. In response to an integrity status greater than a threshold integrity status, the system 100 can present the user with a prompt to post a listing for the particular modular computer component to the online marketplace. In response to an integrity status less than a threshold integrity status, the system 100 can present the user with a prompt to recycle or otherwise dispose of the particular modular computer component.

In one variation, the method S100 includes issuing a prompt to the user to query the integrity status of a modular computer component removed from a computing device in response to the removal of a modular computer component from the computing device, in particular if the modular computer component is removed unexpectedly or within a time duration less than an expected useful life of the modular computer component. For example, the method S100 can include: serving a prompt to the user to confirm an integrity status of a second modular computer component; and receiving the integrity status of the second modular computer component from the user. The method S100 can then include generating a first prompt to acquire a third modular computer component in response to the integrity status exceeding a threshold integrity.

In another implementation, the method S100 can automatically record an integrity status of a modular computer component based on the consumption activity of a modular computer component while installed in a computing device and, based on the integrity status of the modular computer component, prompt the user to take a specific action. For example, the method S100 can further include, prior to substitution of the second modular computer component by a first modular computer component at the first computing device: detecting consumption activity of the second modular computer component at the first computing device; and storing consumption activity of the second modular computer component in a component record. The method S100 can also include estimating an integrity status of the second modular computer component based on the component record and generating a second prompt to acquire the third modular computer component in response to the integrity status exceeding a threshold integrity.

As shown in FIG. 6, in another implementation of the system 100 and method S100, the verified and validated product can be added to a user profile based upon a multi-factor authentication of the type described above. For example, if a user scans the QR code of the modular computer component as well as transmits or identifies something known (such as a set of other identifying information (e.g., serial number)) and something held (such as a mobile device app connected to the user account), then the user may add/subtract the validated product from her user account. Therefore, system 100 can execute Blocks of the method S100 to verify the quality and integrity of modular computing components transacted on the online marketplace by receiving information from a user via the user account, or automatically by collecting data directly from components in the form of consumption and use activity data. Further, the user account can implement security features to verify and validate modular computing components associated with a particular user's profile and enable a user to access information about the modular computer components as well as the marketplace for buying, selling, and trading modular computer components. By implementing security features, the system 100 can execute blocks of the method S100 to control the modular computing components available for purchase or sale on the online marketplace and enable a minimum modular computing component quality presence on the online marketplace, thereby ensuring that modular computer components available on the online marketplace are verifiably safe and authentic pieces of hardware upon which a user may rely.

8. Recycling

As shown in the FIGURES, the system 100 can execute Blocks of the method S100 to enable a user to dispose of a modular computer component in an environmentally friendly manner. In one example implementation, the modular computer component webpage can include information and options for recycling or reusing the modular computer component.

For example, the method S100 can include: accessing a device inventory identifying a set of modular computer components installed in the first computing device; and identifying a first modular computer component, for installation in the first computing device. The method S100 can further include: identifying a second modular computer component, in the device inventory, and substitutable within the first computing device by the first modular computer component; and accessing an integrity status of the second modular computer component. The method S100 can further include: in response to detecting substitution of the second modular computer component by the first modular computer component in the first computing device, appending the first modular computer component to the device inventory; and, in response to the integrity status falling below a threshold integrity, generating a prompt to dispose of the second modular computer component.

In another implementation, the system 100 can execute Blocks of the method S100 to track the consumption activity of a modular computer component throughout several devices based on the component record and identify an end-of-useful-life of the modular computer component based on the integrity status. Detection of an integrity status indicating end-of-useful-life of the modular computer component triggers a prompt to recycle or otherwise dispose of the modular computer component.

For example, the method S100 can include: accessing a device inventory identifying a set of modular computer components installed in the first computing device; and identifying a first modular computer component, of the first component type, for installation in the first computing device. The method S100 can include: identifying a second modular computer component, in the device inventory, and substitutable within the first computing device by the first modular computer component; interpreting an integrity status of the second modular computer component based on consumption activity stored in the component record; in response to detecting substitution of the second modular computer component by the first modular computer component in the first computing device, appending the first modular computer component to the device inventory; and, in response to the integrity status of the second modular computer component falling below a threshold integrity, generating a prompt to dispose of the second modular computer component. The integrity status falling below a threshold level of integrity can indicate the end of the useful life of a particular modular computer component. In response, the system 100 can restrict a user from listing the component on the online marketplace, and instead prompt the user to recycle the particular modular computer component.

In yet another example, a user can scan the QR code of a mainboard component in her laptop, at which time her mobile device will be directed to the appropriate information page or marketplace for the mainboard component. If the user is going to dispose of the modular computer component by recycling, then the hosted webpage can include and the mobile device can display a link for recycling tips or requirements, including an option for downloading and printing shipping labels to ship the selected modular computer component product to a selected recycling organization. The user may select a recycling option or location via her mobile device and through her user account, at which time the shipping label can be automatically generated based on the selected destination and the user's origin. Shipping costs for recycling the modular computer component can be billed directly to the user account in the marketplace, included in the original purchase price of the modular computer component, or included in the original purchase price of a replacement modular computer component. Upon shipping confirmation, the user may print the shipping label, affix it to appropriate packaging, and ship the selected modular computer component to the selected recycling organization.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   at a first time:
      accessing a first device inventory identifying a first set of modular computer components installed in a first computing device of a first device type associated with a user; and
      identifying a first modular computer component, of a first component type, for installation in the first computing device;
   identifying a second modular computer component of the first component type, in the first device inventory, and substitutable within the first computing device by the first modular computer component;
   in response to detecting substitution of the second modular computer component by the first modular computer component in the first computing device:
      appending the first modular computer component to the first device inventory; and
      appending the second modular computer component to a disjoined component inventory associated with the first user, the disjoined component inventory identifying a second set of modular computer components disjoined from the first computing device;
   identifying a device template defining a target set of component types assemblable into a second device type;
   identifying a third modular computer component contained in the target set of component types and excluded from the disjoined component inventory;
   identifying a desktop computer housing configured to house the target set of component types;
   manufacturing the desktop computer housing at an additive manufacturing device; and
   generating a prompt to acquire the desktop computer housing and third modular computer component for combination with the second modular computer component to complete a second computing device of the second device type.

2. The method of claim 1:
   wherein identifying the first modular computer component for installation in the first computing device comprises:
      accessing an image, captured by a camera in a mobile device manipulated by the user, while unpacking the first modular computer component;
      detecting a set of features in the image;
      detecting a first optical identifier of the first modular computer component in the set of features; and
      identifying the first modular computer component based on the first optical identifier; and
   further comprising transmitting the prompt to the mobile device in response to detecting substitution of the second modular computer component by the first modular computer component in the first computing device.

3. The method of claim 2, further comprising, in response to identifying the first modular computer component based on the first optical identifier:
   retrieving a set of instructions for installation of the first modular computer component within the first computing device; and
   at the mobile device, rendering the set of instructions.

4. The method of claim 1, wherein accessing the first device inventory identifying the first set of modular computer components installed in the first computing device comprises:
   accessing an image captured by the camera in a mobile device manipulated by the user after removing an access panel from the first computing device;
   detecting a set of features in the image;
   detecting a set of optical identifiers of modular computer components installed in the first computing device at the first time;
   identifying the set of modular computer components, installed in the first computing device at the first time, based on the set of optical identifiers; and
   populating the first device inventory with the set of modular computer components.

5. The method of claim 1:
   wherein identifying the first modular computer component for installation in the first computing device comprises, at an online marketplace, receiving an order for the first modular computing component of the first component type submitted by the user;
   further comprising, in response to receiving the order and prior to confirming the order for the user, serving the prompt to acquire the third modular computer component to the user via the online marketplace; and
   further comprising, in response to receiving confirmation of the prompt from the user, appending the third modular computing component to the order.

6. The method of claim 1:
   further comprising:
      serving a second prompt to the user to confirm an integrity status of the second modular computing component; and
      receiving the integrity status of the second modular computing component from the user; and
   wherein generating the prompt to acquire the third modular computer component comprises generating the prompt to acquire the third modular computer component in response to the integrity status exceeding a threshold integrity.

7. The method of claim 1:
   further comprising:
      prior to substitution of the second modular computer component by the first modular computer component at the first computing device:
         detecting consumption activity of the second modular computer component at the first computing device; and
         storing consumption activity of the second modular computer component in a component record; and
      estimating an integrity status of the second modular computing component at the first time based on the component record; and
   wherein generating the prompt to acquire the third modular computer component comprises generating the prompt to acquire the third modular computer component in response to the integrity status exceeding a threshold integrity.

8. The method of claim 1, further comprising:
   at a second time:
      accessing a second device inventory identifying a second set of modular computer components installed in the first computing device; and
      identifying a fourth modular computer component, of a second component type, for installation in the first computing device;

identifying a fifth modular computer component of the second component type, in the second device inventory, and substitutable within the first computing device by the fourth modular computer component;

accessing an integrity status of the fifth modular computer component; and in response to detecting substitution of the fifth modular computer component by the fourth modular computer component in the first computing device:
  appending the fourth modular computer component to the second device inventory; and
  in response to the integrity status falling below a threshold integrity, generating a prompt to dispose of the fifth modular computer component.

9. The method of claim 1, further comprising:
prior to substitution of the second modular computer component by the first modular computer component at the first computing device:
  detecting consumption activity of the second modular computer component in the first computing device; and
  storing consumption activity of the second modular computer component in a component record; and
estimating an integrity status of the second modular computing component at the first time based on the component record; and
in response to the user declining acquisition of the third modular computer component based on the prompt:
  generating a marketplace listing for the second component;
  populating the marketplace listing with the integrity status of the second modular computing component at the first time; and
  loading the marketplace listing onto the online marketplace.

10. The method of claim 9, further comprising, at a second time, in response to a time duration of the marketplace listing present on the online marketplace exceeding a threshold time duration:
  generating a second prompt to acquire the third modular computer component for combination with the second modular computer component to complete a second computing device of the second device type; and
  serving the second prompt to the user.

11. The method of claim 1, further comprising:
at the first computing device, in response to transitioning from an inactive state to an active state:
  reading a component identifier from a data interface on the first modular computer component; and
  detecting substitution of the second modular computer component by the first modular computer component based on the component identifier; and
in response to detecting substitution of the second modular computer component by the first modular computer component in the first computing device:
  initiating a component record for the first modular computer component;
  writing a device identifier of the first computing device to the component record;
  detecting consumption activity of the first modular computer component at the first computing device; and
  storing consumption activity of the first modular computer component in the component record.

12. The method of claim 11, further comprising:
at a second time:
  accessing a second device inventory identifying a second set of modular computer components installed in the first computing device; and
  identifying a fourth modular computer component, of the first component type, for installation in the first computing device;
identifying the first modular computer component, in the second device inventory, and substitutable within the first computing device by the fourth modular computer component;
interpreting an integrity status of the first modular computer component based on consumption activity stored in the component record;
in response to detecting substitution of the first modular computer component by the fourth modular computer component in the first computing device, appending the fourth modular computer component to the first device inventory; and
in response to the integrity status of the first modular computer component falling below a threshold integrity, generating a prompt to dispose of the first modular computer component.

13. The method of claim 1, further comprising, in response to activation of the second computing device:
  detecting assembly of the second modular computer component and the third modular computer component to complete the second computing device of the second device type;
  removing the second modular computer component from the disjoined component inventory; and
  generating a second device inventory identifying a second set of modular computer components installed in the second computing device, the second device inventory comprising the second modular computing component and the third modular computing component.

14. The method of claim 1:
wherein identifying the first modular computer component comprises identifying the first modular computer component comprising a central processing unit for installation in the first computing device comprising a laptop computer; and
wherein identifying the device template comprises identifying the device template defining the target set of component types assemblable into the second device type comprising a desktop computer tower.

15. The method of claim 1:
wherein accessing the first device inventory identifying the first set of modular computer components installed in the first computing device of the first device type associated with the first user comprises, in response to initial availability of the first modular computer component via an online marketplace, accessing the first device inventory identifying the first set of modular computer components installed in the first computing device of the first device type at the first time; and
wherein identifying the second modular computer component of the first component type comprises:
  accessing a first characteristic of the first modular computer component;
  accessing a second characteristic of the second modular computer component; and
  in response to the first characteristic exceeding the second characteristic by more than a threshold upgrade difference:
    identifying the second modular computer component for substitution within the first computing device by the first modular computer component; and generating a second prompt to acquire the first modular computer component for substitution of the second modular computer component to upgrade the first computing device.

16. A method comprising:
accessing a first device inventory identifying a first set of modular computer components installed in a first computing device of a first device type associated with a first user;
in response to receiving a selection of a first modular computer component, of a first component type, from the user:
    identifying a second modular computer component, in the first device inventory, of the first component type and substitutable within the first computing device by the first modular computer component;
    accessing a disjoined component inventory associated with the first user and identifying a second set of modular computer components disjoined from the first computing device;
    identifying a device template defining a target set of component types assemblable into a second device type;
    identifying a third modular computer component, of a second component type, contained in the target set of component types, and excluded from the disjoined component inventory; and
in response to detecting substitution of the second modular computer component by the first modular computer component in the first computing device:
    the first modular computer component to the first device inventory; and
    removing the second modular computer component from the first device inventory;
identifying a desktop computer housing configured to house the target set of component types;
manufacturing the desktop computer housing at an additive manufacturing device; and
generating a prompt to acquire the desktop computer housing and third modular computer component for combination with the second modular computer component to complete a second computing device of the second device type.

17. The method of claim 16, wherein accessing the first device inventory identifying the first set of modular computer components installed in the first computing device comprises:
    accessing a live video feed captured by a camera in a mobile device manipulated by the user after removing an access panel from the first computing device;
    detecting a set of features in the live video feed;
    detecting a set of optical identifiers in the set of features;
    for each optical identifier in the set of optical identifiers detected in the live video feed:
        identifying a modular computing component associated with an optical identifier, installed in the first computing device;
        retrieving component attributes of the modular computing component; and
        rendering a set of augmented reality annotations including the component attributes, on the live video feed proximal the location of the modular computing component in the live video feed.

18. The method of claim 16:
wherein identifying the first modular computer component for installation in the first computing device comprises:
    accessing an image captured by a camera in a mobile device manipulated by the user while unpacking the first modular computer component;
    detecting a set of features in the image;
    detecting a first optical identifier of the first modular computer component in the set of features; and
    identifying the first modular computer component based on the first optical identifier; and
further comprising transmitting the prompt to the mobile device in response to detecting substitution of the second modular computer component by the first modular computer component in the first computing device; and
further comprising, in response to identifying the first modular computer component based on the first optical identifier:
    retrieving a set of instructions for installation of the first modular computer component within the first computing device; and
    at the mobile device, rendering the set of instructions.

19. The method of claim 18, wherein rendering the set of instructions at the mobile device comprises playing a prerecorded video depicting:
    partial disassembly of a demonstration computing device of the first computing device type;
    removal of the second modular computing component from the demonstration computing device;
    installation of the first modular computing component within the demonstration computing device; and
    reassembly of the demonstration computing device.

20. A method comprising:
at a first time:
    accessing a first device inventory identifying a first set of modular computer components installed in a first computing device of a first device type associated with a user; and
    identifying a first modular computer component, of a first component type, for installation in the first computing device;
identifying a second modular computer component of the first component type, in the first device inventory, and substitutable within the first computing device by the first modular computer component;
in response to detecting substitution of the second modular computer component by the first modular computer component in the first computing device:
    appending the first modular computer component to the first device inventory; and
    appending the second modular computer component to a disjoined component inventory associated with the first user, the disjoined component inventory identifying a second set of modular computer components disjoined from the first computing device;
identifying a device template defining a target set of component types assemblable into a second device type;
identifying a third modular computer component contained in the target set of component types and excluded from the disjoined component inventory;
identifying a desktop computer housing configured to house the target set of component types;
accessing a digital model of the desktop computer housing; and
generating a prompt to:
    additively manufacture the desktop computer housing according to the digital model at an additive manufacturing device; and acquire the third modular computer component for combination with the second modular computer component and the desktop computer housing to complete a second computing device of the second device type.

* * * * *